(12) United States Patent
Brebner

(10) Patent No.: US 7,133,023 B2
(45) Date of Patent: Nov. 7, 2006

(54) CONTEXT INPUT DEVICE

(75) Inventor: Gavin Brebner, St. Martin d'Uriage (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 370 days.

(21) Appl. No.: 10/635,438

(22) Filed: Aug. 7, 2003

(65) Prior Publication Data

US 2004/0104932 A1    Jun. 3, 2004

(30) Foreign Application Priority Data

Aug. 7, 2002    (EP) .................................. 02354129

(51) Int. Cl.
*G09G 5/00*    (2006.01)
(52) U.S. Cl. ......................... 345/156; 710/73; 361/600
(58) Field of Classification Search ................ 345/157, 345/160, 156, 158; 710/72, 73; 361/600
See application file for complete search history.

(56) References Cited

U.S. PATENT DOCUMENTS

| | | | | |
|---|---|---|---|---|
| 4,425,488 A | * | 1/1984 | Moskin et al. ............... | 200/220 |
| 5,717,423 A | * | 2/1998 | Parker ......................... | 345/108 |
| 6,243,074 B1 | * | 6/2001 | Fishkin et al. ............... | 345/156 |
| 6,658,272 B1 | * | 12/2003 | Lenchik et al. ............. | 345/164 |
| 6,882,335 B1 | * | 4/2005 | Saarinen ...................... | 345/156 |
| 2002/0142807 A1 | * | 10/2002 | Cho ............................. | 455/564 |
| 2002/0186528 A1 | * | 12/2002 | Huang ......................... | 361/683 |
| 2003/0214481 A1 | * | 11/2003 | Xiong ......................... | 345/157 |
| 2004/0223622 A1 | * | 11/2004 | Lindemann et al. .......... | 381/79 |

* cited by examiner

*Primary Examiner*—Amr A. Awad
*Assistant Examiner*—Seokyun Moon
(74) *Attorney, Agent, or Firm*—Foley & Lardner LLP

(57) ABSTRACT

The invention provides for context detecting apparatus which includes a housing shaped to allow the apparatus to be positioned in a plurality of orientations each corresponding to at least one particular context, means adapted to detect the orientation and communications means for communicating the orientation that thus context to a device. The housing may a cube, triangular pyramid or a regular or irregular solid and the detection means correspond to one or more sensors adapted to sense the orientation of the apparatus. The apparatus may be used to sense and communicate the context of a users activity and/or environment to a recipient computer in order to change the operating state of the computer. Changes in operating state may include causing the computer to go to standby, filtering email/messages and similar functional characteristics.

18 Claims, 4 Drawing Sheets

CONTEXT INPUT DEVICE

TECHNICAL FIELD

The present invention relates to methods and apparatus for detecting a users context. The invention also relates to methods and apparatus for transmitting a users context to a device such as a computing device, PDA or cellular phone. The invention further offers a simple manner to communicate user context, and hence would also be suitable for consumer devices such as intelligent home appliances, or toys.

The invention also relates to methods and apparatus for modifying the operating mode, behavior or context of a computing device in response to a users context and changes in a users context.

BACKGROUND ART

In the present specification, context means the environment surrounding an activity that can be quantified using data describing the environment. This allows particular aspects of an activity to be adapted to be more appropriate to the situation.

An example of context is where a mobile phone user is in a physical situation such as a business meeting which requires the use of a discreet ring-tone. Here, an inaudible annunciation such as phone vibration or the appearance of an on-screen icon signals an incoming call. The context as it relates to the mobile phone device is to specify the execution of an action in a way which is sensitive to the phones environment. This can be referred to as a change in the operational state of the mobile phone.

Communicating the context to the relevant device may be as straightforward as the user selecting a silent phone mode by entering a parameter profile via the phone keypad. However, in some situations communication occurs quickly and requires that a user be able to communicate such a change to a device rapidly and unambiguously. It is this aspect of context detection and specification with which the invention is concerned.

Some research has been done on context-sensitive systems such as mobile devices which directly or indirectly deduce context information using sensors. These systems often provide changing context data depending on the physical location of the device. Physical location is an inherent aspect of context and, along with timing information, can be used to filter nearby observations or actions as relevant context, from more distant and less relevant factors.

Although this type of context sensing can provide sophisticated situational data, there are many contexts where all that is required is to determine the users work-state in a coarse-grained manner. The present invention focuses on an uncomplicated and inexpensive system for communicating a users context to a device which is intuitive, rapidly user-switchable and straightforward to implement using available technology.

As will become clear from the following description, the invention, while being simple in operation, is extensible and capable of modification by the user, to allow communication of context data to other devices and covering a range of contexts.

In the presently envisaged application, the invention may be applied in a work or home environment and ideally in the context where a user interacts with a desktop or portable computer according to a number of operational states. Here an operational state can be identified with a context such as work, private email, browsing, out to lunch, private activity etc. An important factor is that the context information reflects real and intuitive actions and situations as applied to the user.

In such a situation, it would be useful to be able to communicate the users present context to a device. A useful illustration exists in the workplace environment where instant messaging, email or similar communication systems cause interruptions in the form of incoming calls or messages. These can be difficult to ignore. A user, when faced with an incoming email or an instant message, is usually tempted to read or respond to them immediately. This can be distracting and counter-productive. It would be useful if there existed a system which would allow a user to communicate his or her context to the corresponding communication device easily and intuitively in order to block, filter or otherwise manage this incoming information. To this end, the context also needs to be rapidly switchable as the focus of a user's attention can quickly change from, for example, "working": a low interruption state, to "browsing the web": a high interruption state.

The solution should ideally be easily configurable so that the user can tailor his or her environment to respond in the desired manner to a range of selected contexts. Also, the solution should be intuitive, easy to understand and, above all, accurate and reliable.

It is an object of the present invention to provide a context communication system and method which allows a user to specify context in the way outlined above.

DISCLOSURE OF THE INVENTION

In one aspect, the invention provides for a context detecting apparatus including a housing shaped to allow the apparatus to be positioned in a plurality of orientations each corresponding to at least one particular context, means adapted to detect the orientation and communications means for communicating the orientation that thus context to a device.

The housing may be a cube, triangular pyramid or a regular or irregular solid.

The detection means may correspond to one or more sensors adapted to sense the orientation of the apparatus.

In one aspect, the orientation way be transmitted to the device by means of a cable.

In an alternative aspect, the orientation may be communicated to the device by wireless means.

In a preferred embodiment, the device is a computer peripheral whereby each orientation of the peripheral corresponds to a specific user context when using an associated computer.

In an alternative aspect, the invention provides for a device adapted to be responsive to a context detecting apparatus as hereinbefore defined.

Preferably, the device is a computing device adapted to switch between different operating states in response to the orientation of the context detecting apparatus.

The operating states may include the computer going into standby, being locked, filtering, storing, buffering, setting authorization states or otherwise manipulating incoming email and/or messages.

The computer is preferably configurable by the user to allow the definition of and switching between different operating states.

In yet a further aspect, the invention provides for a context detection system including a peripheral device adapted to output a signal corresponding to its orientation and a computer adapted to change its operating state in response to the signal thereby allowing the control of the computer be means of the orientation of the peripheral.

In a further aspect, the invention provides for a method of detecting user context, the method comprising the steps of a user orienting a context detection sensing means in a physical orientation corresponding to a chosen context, a device interpreting the context and modifying its behaviour accordingly.

In a further aspect, the invention provides for a method of customising the appearance of the device by displaying user-selected or designed images and text.

BRIEF DESCRIPTION OF THE DRAWINGS

The present invention will now be described by way of example only and with reference to the drawings in which.

BEST MODE FOR CARRYING OUT THE INVENTION

Figure 1:
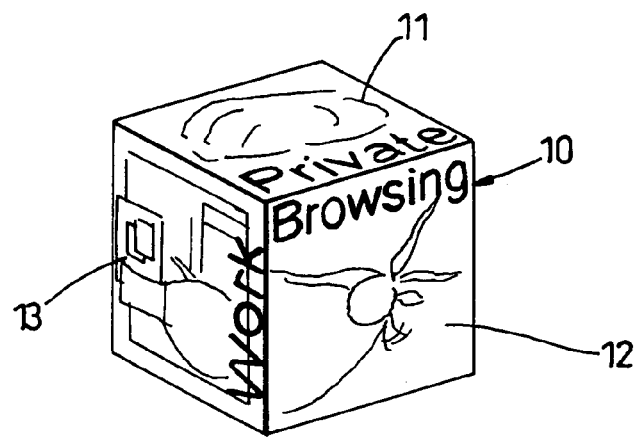
FIG. 1: illustrates an example of a context detection/communication apparatus.

Referring to FIG. 1, an example of a context detecting apparatus 10 is shown. In this description the expression "context cube" or "cube" will be used to refer to the context detecting apparatus. However, it is to be understood that this expression is not to be construed as limiting and other geometries are possible depending on the particular situation and application. Also, although the device is referred to as context detecting, it is to be appreciated that the device is also the mechanism for transmitting the context to the hardware to which it is connected, or the recipient machine.

Referring to FIG. 1, the context cube 10 includes a housing shaped to allow it to be positioned in a plurality of orientations. Here, the housing can be positioned in any one of six orientations. That is, with any of its six faces visible on top. Each orientation corresponds to at least one particular context. In some cases an orientation may correspond to more than one context, for example, it may be useful to define a context that is the combination of private and web browsing as distinct from work and web browsing. This may trigger a different operational state which screens private email in the second combined context.

Referring to FIG. 1, the cube is shown in the "private" context. The cube is configured with other context indicators including, for example, "browsing" 12 and "work" 13. In this case the cube can be manufactured with specific predefined generic contexts such as those shown. However, it would be possible to configure the cube by custom-printing different labels for each of the faces. In an alternative embodiment, a more expensive version of the device could have the ability to display the custom labels via displays integrated into the device faces. The label-definition functionality may be part of an application suite or development kit for the device which would also be used to configure the recipient devices behaviour in terms of switching its operational state.

Figure 2:
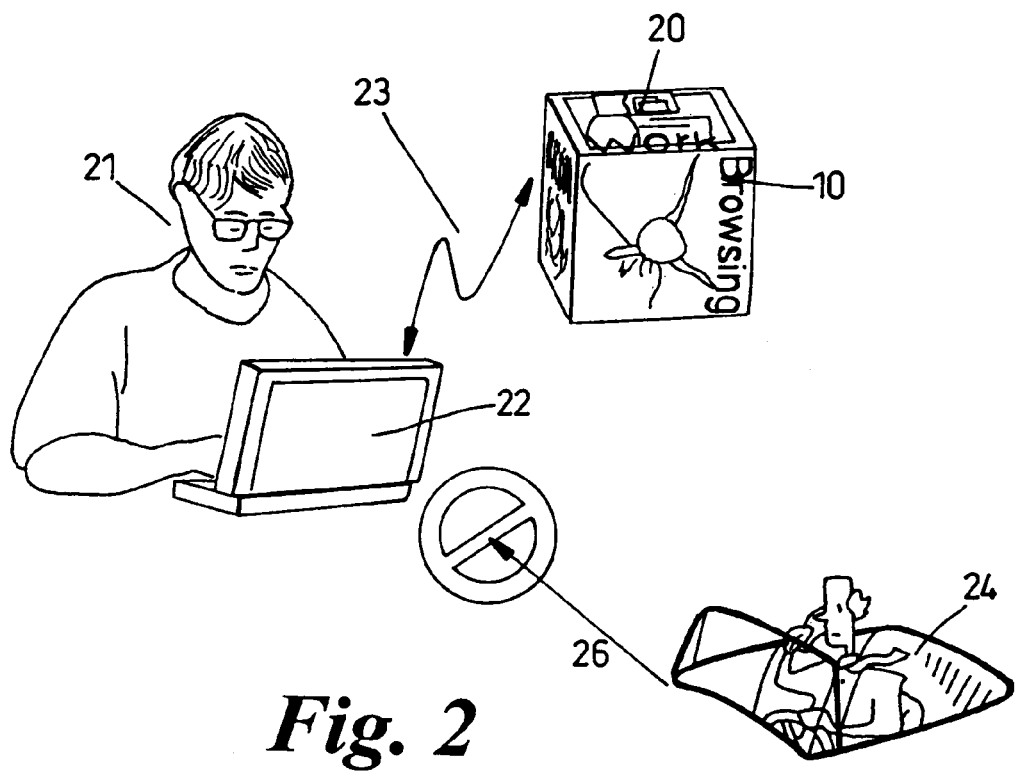
FIG. 2: illustrates using the context detection/communication apparatus in a working context diverting private calls.

Referring to FIGS. 1 and 2, the apparatus 10 includes wireless communications means 23 for communicating the orientation and thus context, to an external device such as a laptop computer 22. In this case the cube would incorporate an internal antenna and have an internal battery bay accessible by removing one of the faces. Alternatively, the cube may communicate with the device 22 by means of a cable connection (USB or serial), infra red or similar.

Figure 5:
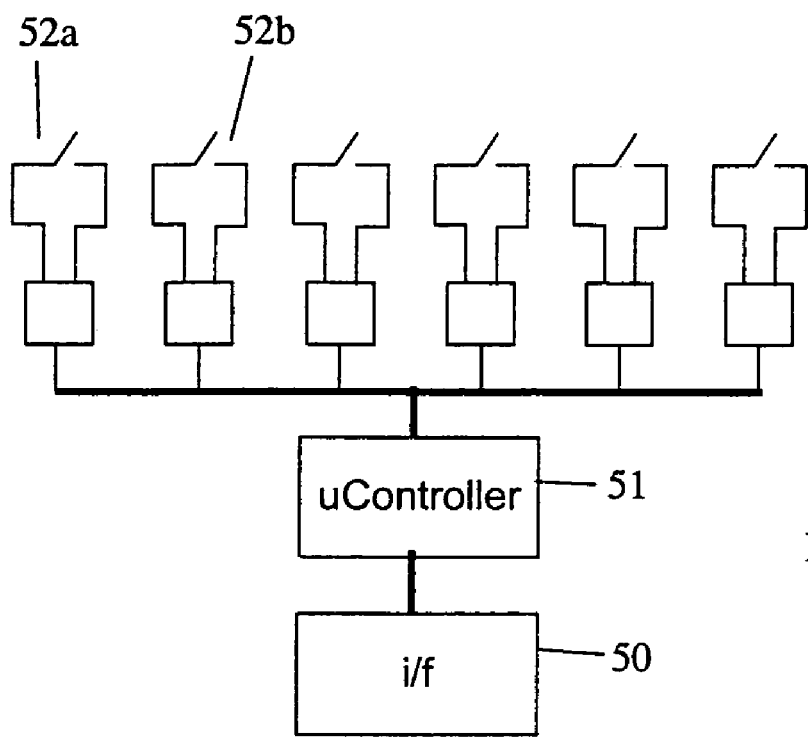
FIG. 5: illustrates an apparatus orientation sensing means.
Figure 6:
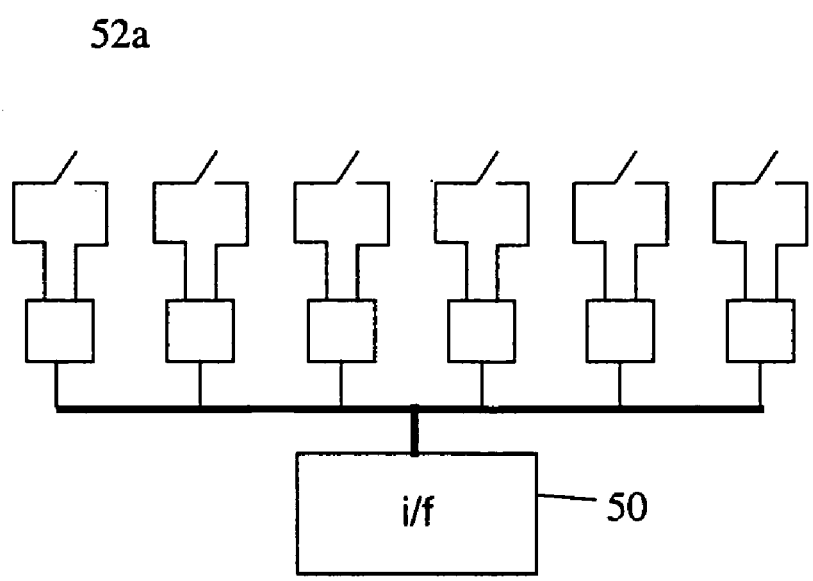
FIG. 6: illustrates an alternative apparatus orientation sensing means.

The orientation of the context cube 10 is detected using one or more sensors. Referring to FIG. 6, an array of 6 microswitches is used to detect when the cube is positioned with each of it six faces upward. The microswitches are activated when the corresponding face is brought into contact with a supporting surface. When the switch is closed, the device registers this as the peripheral being placed in a selected orientation. In FIG. 5, the sensors are connected to six single-bit registers 50 which can be read externally, for example via a serial line. FIG. 5 shows a slightly more complex version which includes a microcontroller 51 that generates an event identifying the cube's orientation which is transmitted to an external device when the cube orientation changes. Other types of sensors could be used such as mercury switches or variants on same. These can be configured to detect the orientation of the peripheral when the conducting fluid closes a circuit for any particular orientation. Other sensors might operate optically by detecting when an aperture is obscured by the supporting surface. Other systems might use pressure sensors of various types known in the art.

A straightforward situation where the cube is used is as follows. Referring to FIG. 2, a situation is shown where a user 21 is working using a laptop computer 22 and wishes to filter private callers 24. To signify this context, the user 21 places the context cube in the orientation shown with the upward face indicating "work". The cube detects this orientation and transmits this orientation to a management application running on the computer 22. In response the computer switches to a private operational state and screens incoming personal calls. This can be implemented using a nominated or allowed-caller list which filters incoming calls and diverts those not on the list. Thus when a personal caller 24 phones, his call is diverted to voicemail.

To deselect the "work" context and select the "private" context, the user picks up the cube and positions it in the orientation shown in FIG. 1. This new orientation is detected by the cube and transmitted to the management software whereby the context is determined and the operational state of the computer changed accordingly.

Figure 3:
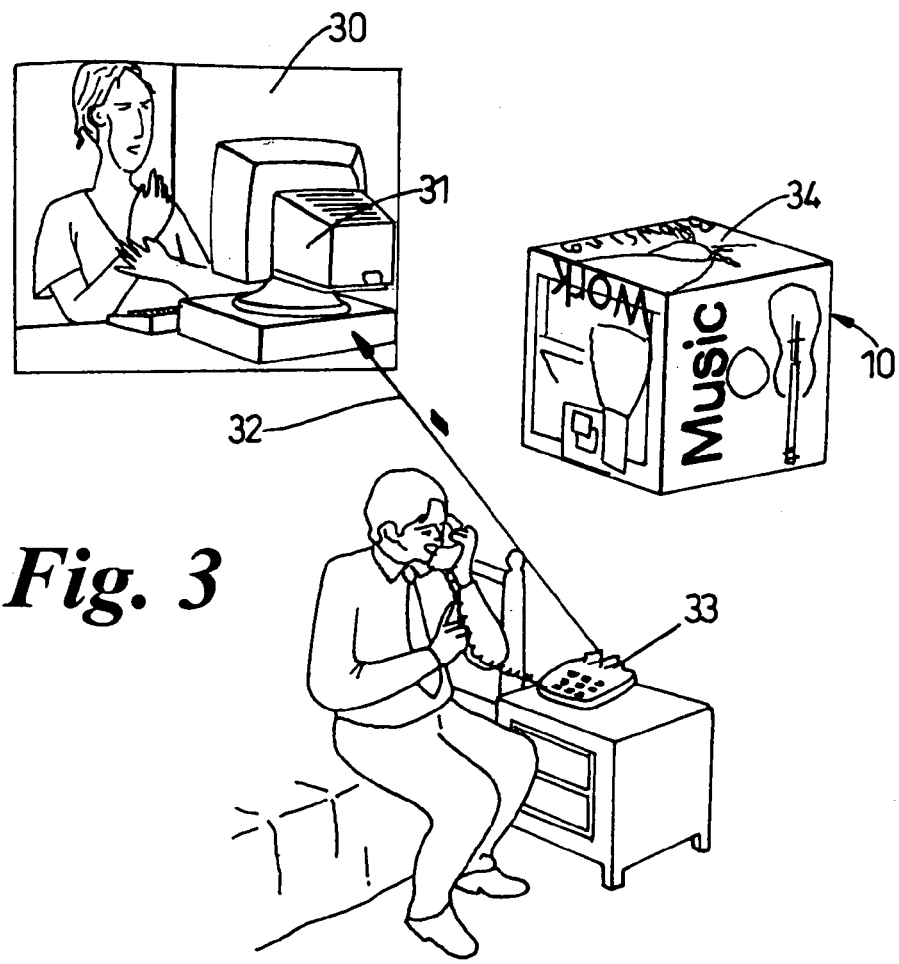
FIG. 3: illustrates using the context detection/communication apparatus in a browsing context allowing private calls.

An alternative situation is shown in FIG. 3 where a user 30 is browsing using a desktop computer 31. In this case, the user positions the cube with the "browsing" face up and the management system selects an operational state which allows incoming private calls (33/32).

While the example discussed above has referred to screening incoming calls, the invention may be used to control a large number of operational states of a computer. These include causing the computer to go into standby, locking the computer, filtering, storing, buffering, setting authorization states or otherwise manipulating incoming email and/or messages and similar functionality. Other more specialized operational states may be possible depending on the activities of the user, the hardware being controlled and the environment in which the computer is used. For example, the invention could be used in a electronic cash register situation to quickly secure the register when a sales assistant is away from the cash desk. The invention might also be used to control the functions of a telephone, for example, turning down/up or muting telephone speaker volume depending on the activity of the user or changes in the user surrounding environment.

It is envisaged that the system could be managed using a configuration or management tool running on the laptop, PC or possibly a server. The primary functions of this tool would be to set up the system so that the different orientations are correlated with corresponding contexts and hence, on the PC, with specified operational states.

The management tool can be configured by means of a GUI which allows the user to configure operational states and the triggering orientation with which they are identified. The management tool can also include functionality for preparing artwork including text, and then for printing the labels that can be attached to the cube to indicate the users custom contexts. Examples of these are shown in the figures.

It is envisaged that the management tool would be extensible to an arbitrary-sided or generalized peripherals. In this generalized case, the process would be to initialize the peripheral and define each required context and it's corresponding change in operational state of the recipient machine. As the orientation of the peripheral needs to be initialized, the interface could step the user through the various orientations one by one and record each along with its corresponding context and state change.

The context cube may be used to transmit context and therefore control the operational state of other devices such as PDAs, cellular phones and desktop PCs. In the case of a PDA, the context may be used to filter incoming email or chat messages. The specific implementation will depend on the functionality of the PDA itself and may include such modes as a "security" context. In this situation it is common for a PDA to be left in its cradle while its owner is away from his or her desk. By positioning the context cube in the "private" orientation, the PDA locks and a password is required to access the device on the users return.

Figure 4:
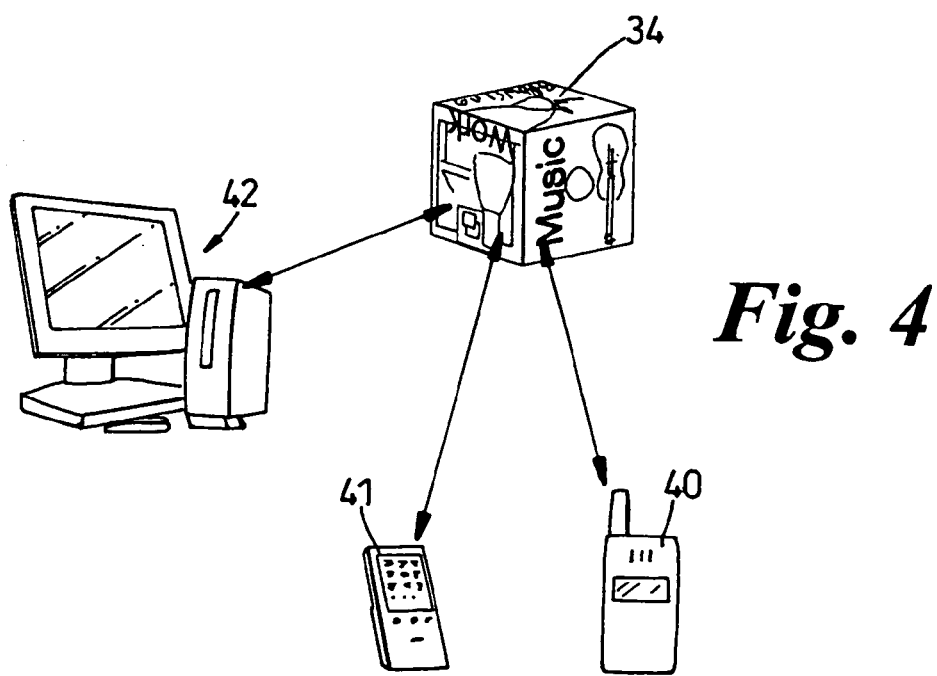
FIG. 4: illustrates direct communication between the context apparatus and an array of recipient machines.
Figure 7:
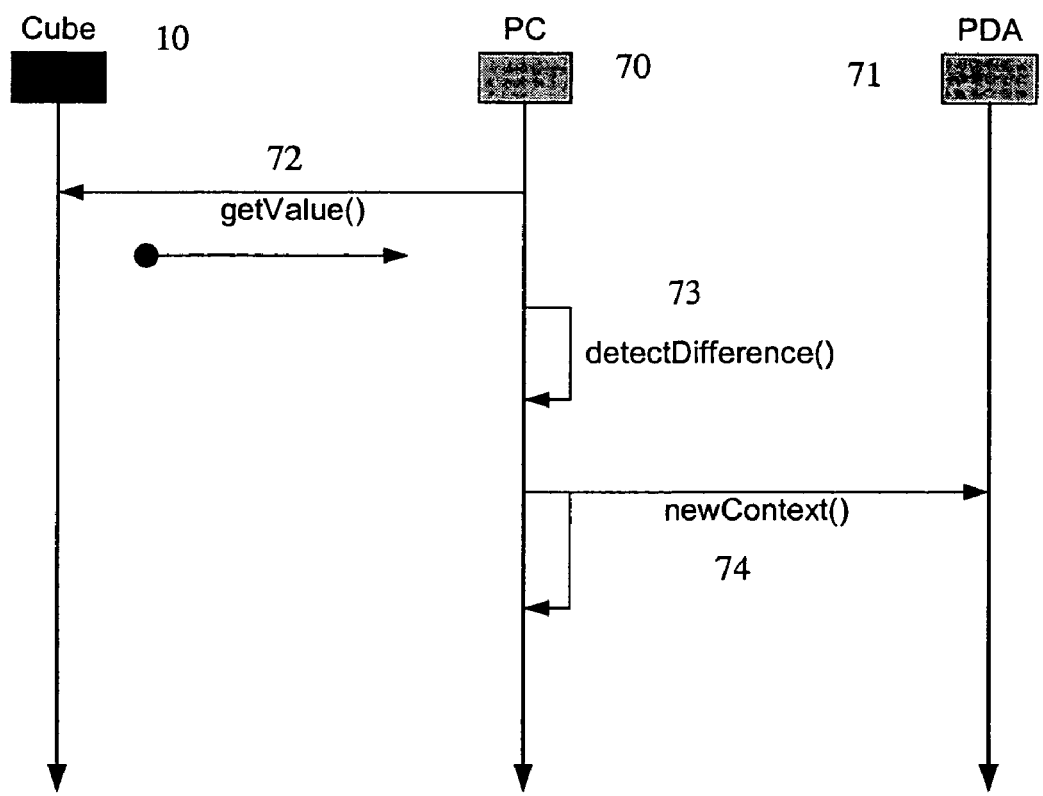
FIG. 7: illustrates a process chart for changing a context.

In the case of the cellular phone, positioning the cube in the "private" orientation might cause the phone to switch its operational state to discreet where the phone either diverts all calls or filters incoming calls and diverts personal calls to voicemail. Again, the act of repositioning the context cube is significantly faster than selecting the corresponding operational state using the phone's interface. In addition, a single cube can be used to communicate a context change to a large variety of users. Positioning a cube is also a more natural interaction method for non-sophisticate users. To implement such an environment, there are number of options. The cube could communicate directly with the devices as shown in FIG. 4. Alternatively, the cube could use the PC 42, as a base station and allow it to manage communication to the devices. This latter technique could leverage an integrated cube management tool to act as an interface between the cube and the various devices. Indirect communication between the peripheral and the various devices is shown in FIG. 7. Here, the PC 71 polls 72 the cube 10 for the context value. If a new value is found 73, it communicates the value 74 to, for example, a PDA 71, thereby altering its operational state. This flow control example is illustrative and other variations and communications architectures may be possible.

Although the example shown is in the form of a cube, other shapes may be amenable to use with the invention. The form and function of the peripheral may be defined by aesthetic issues, function, expandability and speed of context selection. It is envisaged that the invention would be inexpensive to manufacture, and the management GUI would be relatively uncomplicated to implement. Much of the technology needed to implement communication exists. It is therefore believed that the invention provides for an easy to use and highly flexible solution to providing context input to a variety of recipient machines.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

This application claims priority from European Patent Application 02354129.5, filed Aug. 7, 2002, which is incorporated herein by reference in its entirety.

The invention claimed is:

1. A context detecting apparatus comprising:
a housing shaped to allow the apparatus to be positioned in a plurality of orientations each corresponding to at least one particular context,
means to detect the orientation of the apparatus from among the plurality of orientations,
communications means for communicating the detected orientation to a device separated from the context detecting apparatus, and
means for changing an operating state of the device based on the detected orientation communicated to the device by the communication means,
wherein changing the operating state of the device has no effect on an operating state of the apparatus, and
wherein the housing comprises a regular or irregular solid having a plurality of faces each having unique indicia associated therewith, to allow a user to place the solid at a particular orientation based on which operating state of the device corresponding to one of the unique indicia is desired by the user.

2. A context detecting apparatus as claimed in claim 1 wherein the detection means corresponds to one or more sensors adapted to sense the orientation of the apparatus.

3. A context detecting apparatus as claimed in claim 1 wherein the orientation is transmitted to the device by means of a cable.

4. A context detecting apparatus as claimed in claim 1 wherein the orientation is communicated to the device by wireless means.

5. A context detecting apparatus as claimed in claim 1 wherein the apparatus is configured to identify one or more orientations with one or more corresponding contexts.

6. A context detecting apparatus as claimed in claim 1, wherein the apparatus is a computer peripheral and wherein each orientation of the computer peripheral corresponds to a specific user context when using a defined plurality of associated computers.

7. A device adapted to be responsive to a context detecting apparatus as claimed in claim 1.

8. A context detecting apparatus as claimed in claim 1, wherein the device is a personal computer adapted to switch between different operating states in response to the orientation of the context detecting apparatus.

9. A device as claimed in claim 8 wherein the different operating states include the personal computer going into standby, being locked, filtering, storing, buffering, setting authorization states or otherwise manipulating incoming email and/or messages.

10. A device as claimed in claim 8 wherein the different operating states correspond to choice of software and desktop layout of the personal computer.

11. A device as claimed in claim 8 adapted to be configurable by a user to allow the definition of and switching between different operating states.

12. A device as claimed in claim 8, further comprising means to control a second device in response to context information received from the context detecting apparatus, the second device corresponding at least one of a telephone and a speaker.

13. A context detection system comprising:
  a peripheral device, adapted to output a signal corresponding to its orientation, and
  a computer communicatively connected to the peripheral device and adapted to change its operating state in response to the signal output by the peripheral device, thereby allowing the control of the operating state of the computer based on the orientation of the peripheral device,
  wherein the operating state of the computer has no effect on an operating state of the peripheral device,
  wherein the peripheral device comprises a regular or irregular solid having a plurality of faces each having unique indicia associated therewith, to allow a user to place the solid at a particular orientation based on which operating state of the computer corresponding to one of the unique indicia is desired by the user.

14. A method of detecting user context, the method comprising the steps of:
  orienting, by a user, a context detection sensing means in a physical orientation corresponding to a chosen context,
  communicating, by the context detection sensing means to a device, the chosen context,
  interpreting, by the device, the chosen context as communicated to the device by the context detection sensing means,
  modifying the behavior of the device in accordance with the chosen context, and
  enabling a user to set, via a setup mode, a plurality of different operating states for the device corresponding to each of the plurality of orientations of the context detection sensing means,
  wherein the enabling step comprises:
    placing the context detection sensing means in a first orientation and assigning a first operating state of the device when the context detection sensing means is in the first orientation;
    placing the context detection sensing means in a second orientation and assigning a second operating state of the device when the context detection sensing means is in the second orientation; and
    repeatedly placing the context detection sensing means in different orientations and assignment different operating states of the device, until all possible orientations have been assigned,
  wherein the modifying of the behavior of the device has no effect on an operating state of the context detection sensing means.

15. A device as claimed in claim 1 wherein the solid corresponds to a cube in which the unique indicia corresponds to a unique printed label provided on each of the faces of the cube.

16. A device as claimed in claim 15, wherein the detecting means includes conducting fluid provided within the cube, wherein the conducting fluid closes one of a plurality of switches provided within the cube when the cube is positioned at a particular orientation, to thereby provide an electronic indication of the particular orientation.

17. A device as claimed in claim 15, further comprising:
  setting means for enabling the user to set a plurality of different operating states for the device corresponding to each of the plurality of orientations of the apparatus.

18. A context detection system as claimed in claim 13 wherein the solid corresponds to a cube in which the unique indicia corresponds to a unique printed label provided on each of the faces of the cube.

* * * * *